Jan. 27, 1931.　　W. H. HOODLESS　　1,790,269
BACK-UP GEAR FOR GASOLINE DRIVEN LOCOMOTIVES
Filed Feb. 26, 1926　　4 Sheets-Sheet 1

Inventor
William H. Hoodless.
by his atty Mark W. Collet

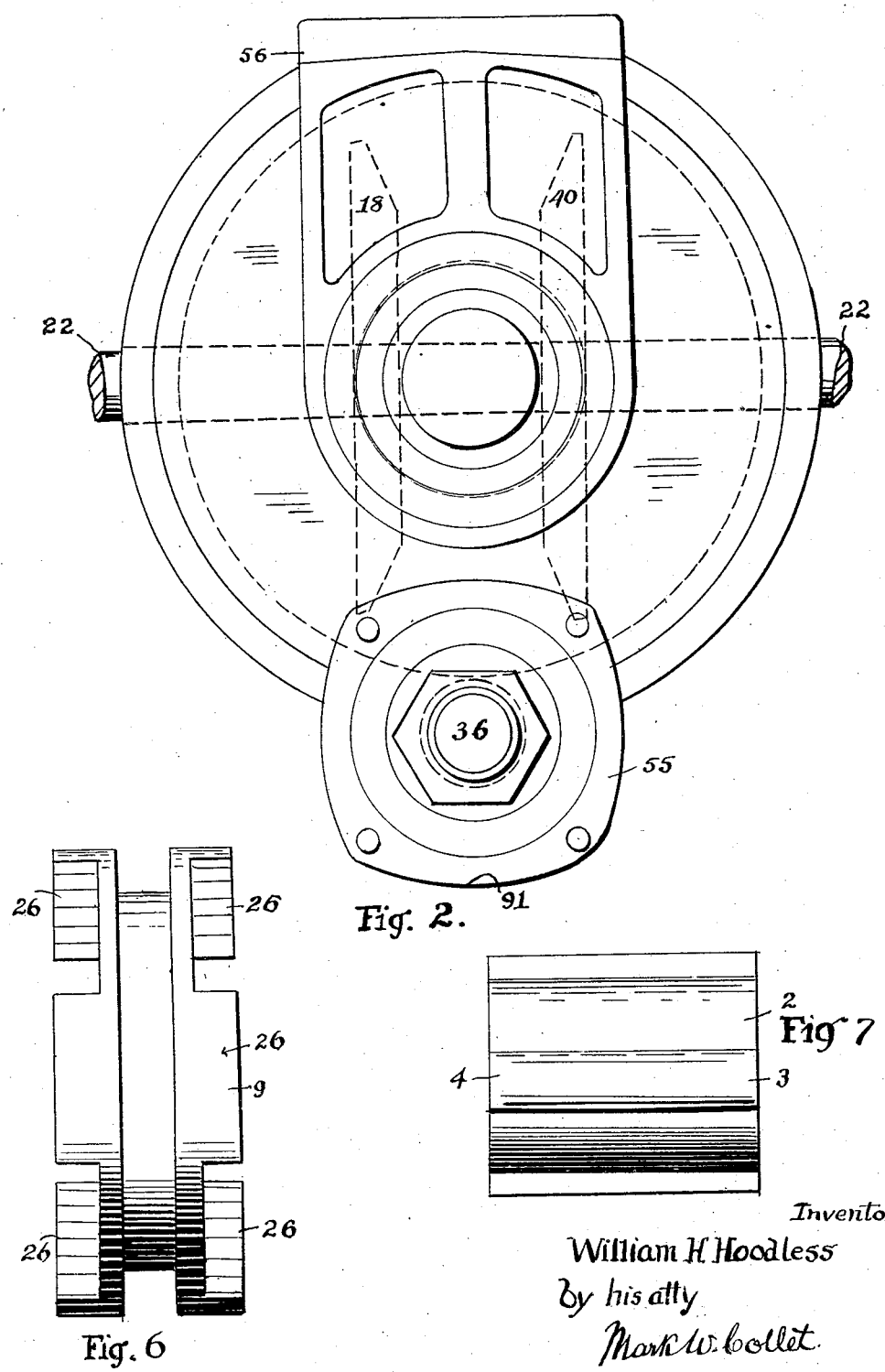

Jan. 27, 1931. W. H. HOODLESS 1,790,269
BACK-UP GEAR FOR GASOLINE DRIVEN LOCOMOTIVES
Filed Feb. 26, 1926 4 Sheets-Sheet 3

Inventor.
William H. Hoodless
by his atty. Mark W. Collet.

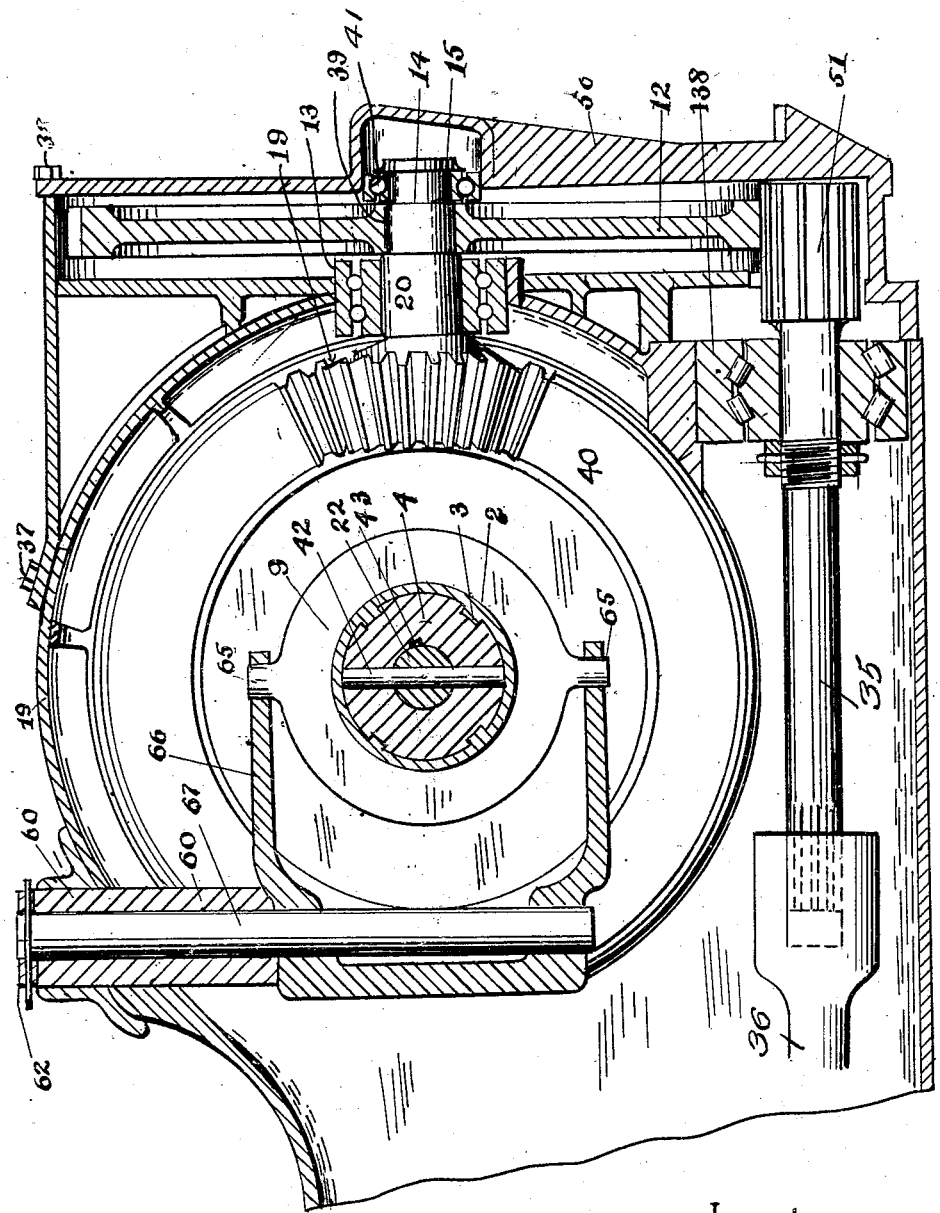

Patented Jan. 27, 1931

1,790,269

UNITED STATES PATENT OFFICE

WILLIAM H. HOODLESS, OF PHILADELPHIA, PENNSYLVANIA

BACK-UP GEAR FOR GASOLINE-DRIVEN LOCOMOTIVES

Application filed February 26, 1926. Serial No. 90,927.

The backing up capacity of the small gasoline driven locomotives, in which various forms of worm gear tractors, form the power plant and transmission, was, prior to the construction of the present device, limited to one very slow speed,—the reverse speed of the tractor. This limited the economical use of these locomotives to movement in one direction and compelled the installation of turn tables, Y's or like devices along the railroad which they were used on. To overcome this objection to the locomotive thus constructed and make possible the use of all the transmission speeds of the tractor in both directions of the locomotive's travel, that is, to enable the locomotive to utilize both the tractor forward speeds and the tractor is the kind selected for adaptation reverse speed, in either direction where the locomotive's travel, is the main purpose of this present device. The tractor can be purchased, and adapted to use as a locomotive for a small fraction of the cost of a locomotive built in the ordinary way, and this has resulted in its large use for this purpose in spite of its objectionable slow backing up. My device is very simple; it changes only the assemblage in the parts immediately connected with the rear axle. It does not change the housing of these parts except by a very little cutting and drilling and a few easily made and attached parts, uses the bearings of any usual form of worm gear driven tractor in their original housing, and is otherwise a very simple mechanism, inexpensive to make and easy and quick to assemble.

Figure 1:
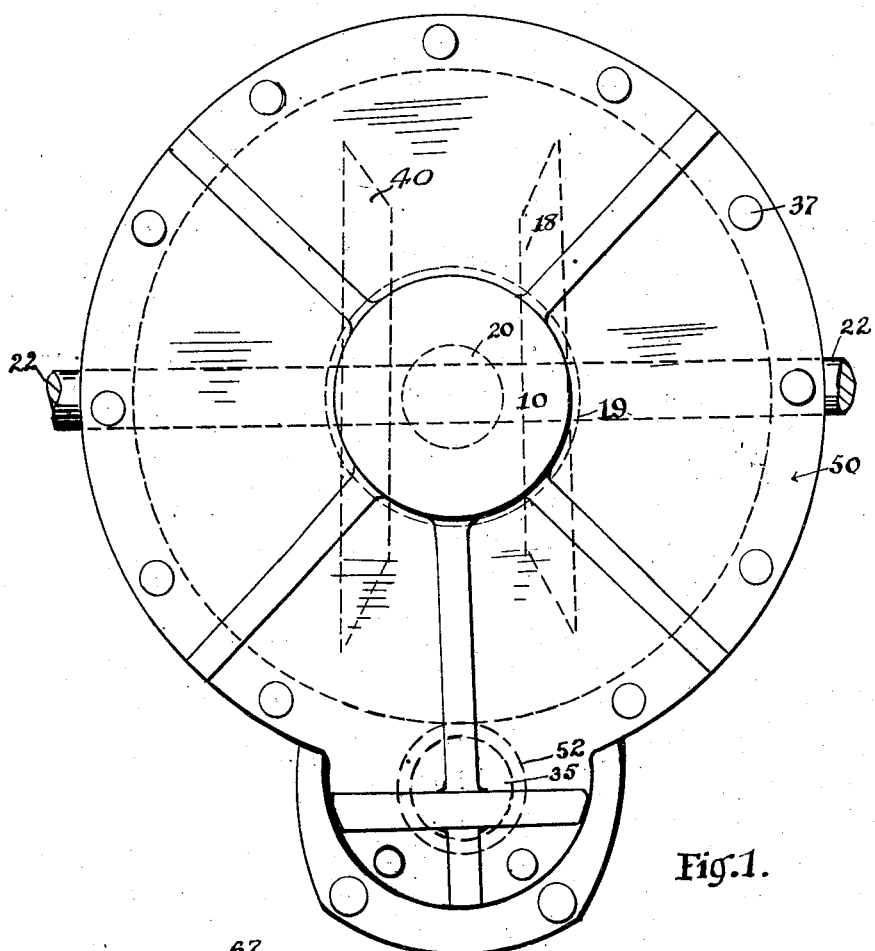
Figure 3:
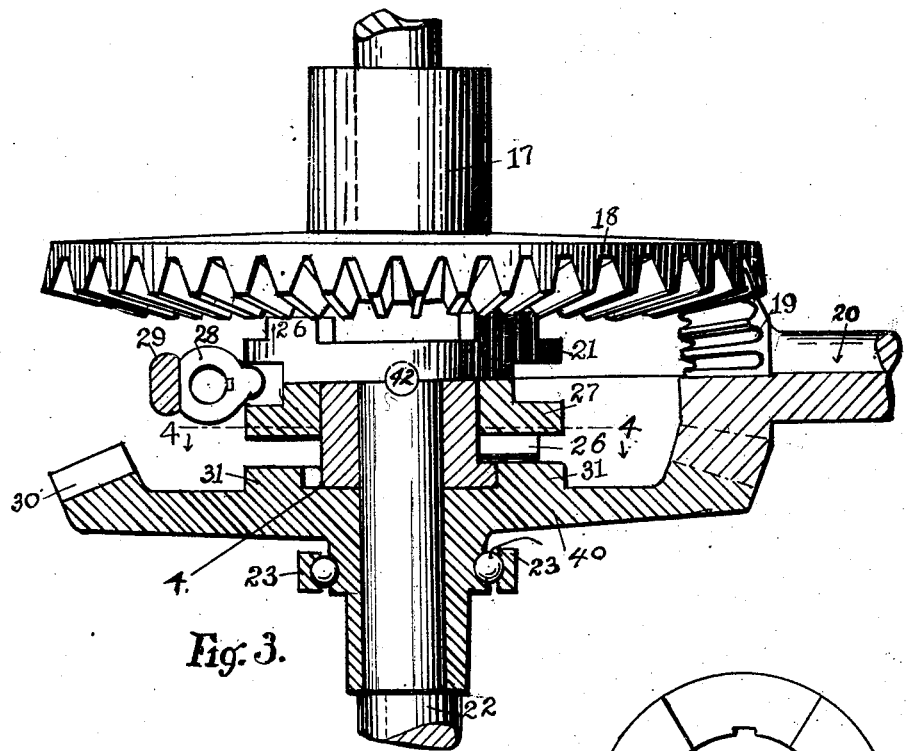
Figures 4, 5:
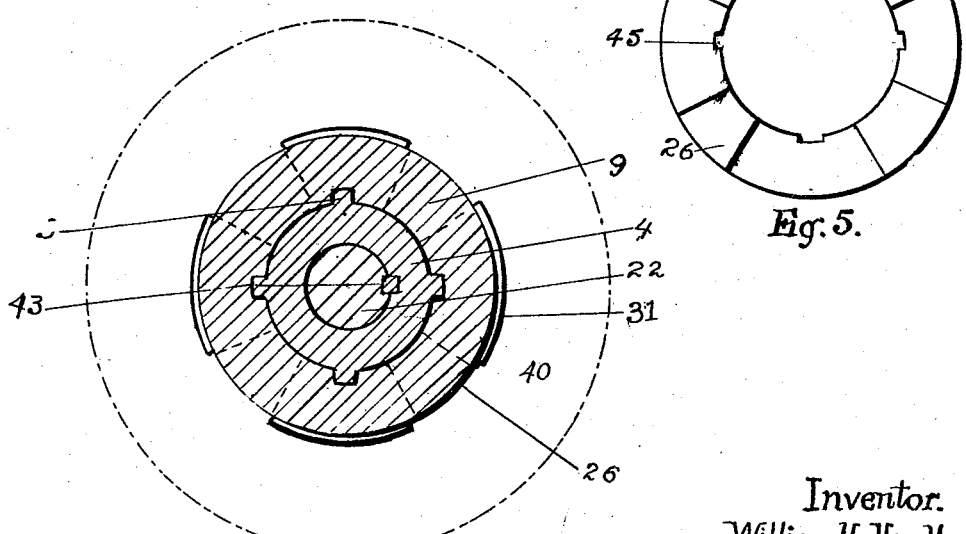

Fig. 1 is a vertical section on a plane containing the axis of the main transmission shaft, and perpendicular to the axis of the rear axle. Fig. 2 is an elevation of the housing from the rear. Fig. 3 is a view partly in plan and partly in section of the assemblage of parts at the rear axle; the section plane containing the axes of the rear axle, and shaft of the driving bevel pinion. Fig. 4 is a section on line 4—4 of Fig. 3. Fig. 5 is an end view of the clutch sleeve.

Figure 9:
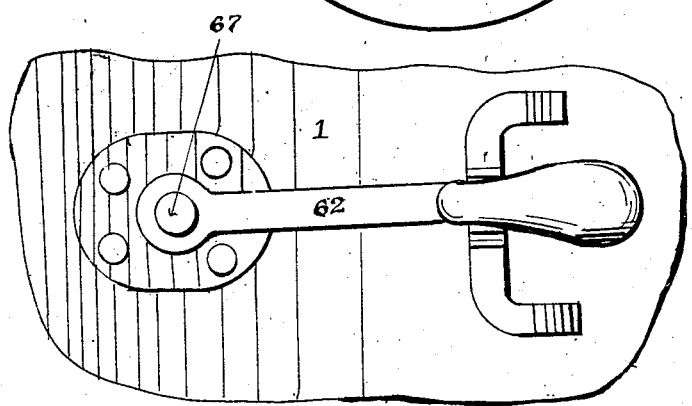

Fig. 6 is a side elevation of the clutch sleeve. Fig. 7 is a view of the splined sleeve. Fig. 8 is a side elevation of the assemblage and Fig. 9 is a view of the clutch shifting lever.

The rear of the driving mechanism of the tractor I usually adapt to form a gasoline driven locomotive is contained in a housing. This housing is the housing marked 1 on the drawings. It contained, before adapted according to my improvement, the standard worm gear drive, for which I substitute part of my train of gears and the clutch and part of the clutch shifting mechanism, which I will describe below; adding to it additional housing which is easily attached, containing other parts of my gear train and the necessary bearings for it. The bearings in the original housing are used unchanged. The axle, 22, is a solid member and extends between the rear wheels. The bevel gear wheels, 18, and 40, are mounted thereon and revolve freely thereon except when engaged by the clutch, which, as a whole, is marked 9. These bevel gear wheels, 18, and 40, are driven by the bevel gear pinion, 19, as will be hereinafter described, and revolve in opposite directions. The clutch assembly is placed between these bevel gear wheels, and is mounted on the axle, 22. It consists of the splined sleeve, 4, that spaces the bevel gears, 18, and 40, from each other and is positioned on the axle, 22, by the pin, 42, and when the clutch is engaged with one of the bevel gear wheels, 18, or 40, drives the axle, 22, by the key, 43. The clutch, 9, is a cylinder with grooves, 45, sliding along the splines, 3, of the sleeve, 2. The clutch, 9, is provided with the teeth, 26, that can be engaged with the clutch teeth, 31, of the bevel gear wheels, 18, and 40 and are driven by them, when so engaged. The clutch and bevel gear wheel assembly is contained in the original housing and bearings of the tractor I usually adapt to form a gasoline driven locomotive without any change. The housing, 1, is cut to allow the introduction of the bevel pinion, 19. The boss, 10, containing the bearing, 13, is inserted in a circular hole in the housing; in which bearing turns the shaft, 20, that carries the bevel pinion, 19, which is preferably integral with it. A suitable packing retains the grease inside the housing 1. On this shaft, 20, is the driven gear wheel, 12, that is suitably keyed upon it, by the key, 39, which can also aid in positioning the wheel, 15. The cover plate, 50, has the bearings, 41, for the end of the shaft, 20, which is positioned firmly between the shoulder, 14, and the nut, 15. The gear case for these latter parts is securely and readily fastened to the housing, 1, by the bolt, 37, and the screws, 38, the cover plate being secured by screws. The whole forms a housing for the assemblage of the gear wheel, 12, and its driving pinion, 51. The driving pinion, 51, is driven by the shaft, 35, which is an extension of the drive shaft, 36. Very conveniently, it may be furnished with the splines, for engagement with the main drive shaft. The usual bearings, 138, are the same in construction and position with the standard Fordson bearings which may be used without change in adapting the tractor.

The bearing, 60, for the clutch shifting devices is inserted through a hole cut in the walls of the case of the housing, 1, and bolted firmly to it. The clutch shifter yoke is provided with the trunnion blocks, 65, 65, and keyed to the shaft which is mounted in the bearings, 60, and is actuated by the lever, 62.

When the locomotive is being driven, the clutch is engaged with one or the other of the bevel gear wheels, 18, or 40, and the locomotive is driven in either direction accordingly. All the speeds of the tractor can be used in either direction.

While the present improvement is directed to the structure that adapts a tractor to be converted into a practically operating gasoline driven locomotive, the details of this structure that are not made elements of the claims are not to be taken as limitations on a claim that does not contain them as elements explicity, or by fair implication.

I claim:

1. In a gasoline driven locomotive formed by the conversion to railroad requirements of the rear axle driving mechanism of a worm driven tractor's transmission, the combination with the rear axle housings, drive shaft, drive shaft housing and rear axle bearings and drive shaft bearings, said axle housing being provided with an opening at the rear thereof, of an extension shaft fitted to the drive shaft and extending beyond the back of the said axle housings, a drive pinion mounted on said extension shaft, a shaft bearing placed in the opening at the rear of said axle housing and carried thereby, a shaft bearing carried from the said axle housing and aligned with the said bearing carried by the housing, a driven gear, a shaft carried by said bearings and carrying said driven gear wheel which meshes with the pinion on the drive shaft and which is situated between said aligned bearings, a driving bevel gear at the end of said shaft, driven bevel gear wheels loosely mounted on the rear axle being in permanent mesh with the driving pinion on opposite sides thereof and a clutch for locking either one of said driven bevel gear wheels to the axle.

2. In a gasoline driven locomotive, formed by the conversion and adaptation to railroad requirements of the rear axle driving mechanism of a worm driven tractor's transmission, the combination with the rear axle housing of the tractor, and drive shaft of the tractor, of an auxiliary housing secured to the rear of the rear axle housing, an extension of the drive shaft extending into said auxiliary housing, a rear axle, an auxiliary shaft carried in bearings in said auxiliary housing and in bearings in the rear of said rear axle housing, and extending into said rear axle housing on a line at right angles with said axle, a bevel pinion carried by said auxiliary shaft and driven thereby, a pair of bevel gears mounted upon and freely turning upon said axle when not clutched thereto, said pair of bevel gears being positioned on opposite sides of said bevel pinion, and in constant mesh therewith, means for bringing the bevel gears selectively into operative connection with said axle, and gearing operatively connected with said auxiliary shaft and the extension of the drive shaft, and enclosed within the said auxiliary housing.

3. In a locomotive formed by the conversion and adaptation to railroad purposes of a worm driven tractor, the combination with the tractor's rear axle housing and drive shaft, of an axle placed within the rear axle housing and consisting of a solid member extending between the rear wheels, an auxiliary housing attached to the tractor's rear axle housing, an extension of the tractor's drive shaft extending into said auxiliary housing and having a bearing therein, an auxiliary shaft extending through the walls of the tractor's rear axle housing, and having a bearing in said housing, and having its ends projecting into the tractor's rear axle housing and the auxiliary housing respectively, gearing within said auxiliary housing, operatively connecting the said end of the said auxiliary shaft with the extension of the drive shaft, a pinion on the said auxiliary shaft at its end within the rear axle housing, a clutch assembly mounted upon, turning with and movable along the said solid axle, gears mounted upon said rear axle and freely revolvable thereon when not locked thereon by the clutch assembly and positioned on either side of the said pinion within the said tractor's housing and meshing therewith, and means for shifting said clutch, extending through the tractor housing.

4. In a gasoline driven locomotive formed by the conversion and adaptation to railroad requirements of a worm driven tractor's transmission, the combination with the drive shaft and rear axle housing of the tractor of an auxiliary housing secured to said tractor housing, a solid rear axle, an extension to the tractor drive shaft secured thereto, revolving therewith, and extending into the auxiliary housing and having bearings therein, a speed reducing gear couple having shafts and located in said housing, a driving pinion on the shaft of the one of said gear couple of reduced speed which shaft extends into the rear housing of the tractor, a pair of driven gears loosely mounted on the said solid rear axle and driven in opposite directions by said driving pinion and in constant mesh therewith, and the clutch containing a clutch shifter passing through the walls of the tractor housing, a clutch assemblage operatively connected to said shifter and mounted on said solid axle and containing means for locking each of said driven gears to the axle independently of the other.

5. In a locomotive driven by tractor transmission adapted to railroad requirements, the combination with the drive shaft and rear axle housing of the tractor, of an auxiliary housing mounted on and secured to said tractor housing, a splined extension of the tractor drive shaft extending into said auxiliary housing and carried by a bearing therein, a speed reducing gear couple mounted in said auxiliary housing, a spindle driven by the gear of lesser speed of said gear couple, and extending into said tractor housing and a driving bevel gear mounted thereon, a solid axle, a bevel gear assemblage comprising two bevel gears loosely mounted on said axle and in continuous meshing relation with said driving bevel gear pinion, and a clutch mechanism on said axle containing means for clutching either of said driven bevel gears to said axle.

6. In a locomotive driven by tractor transmission adapted to railroad requirements, and having a solid rear axle, the combination with the main drive shaft and rear axle housing, of an auxiliary housing mounted on and secured to said tractor housing, consisting of a casing enclosing the rear of said rear axle housing and fitting tightly against the same along edges of said casing, the said tractor rear axle housing being cut away to form an opening therein on a level with the said axle, and having a journal bearing mounted in said opening, a splined extension for said tractor drive shaft extending into said auxiliary housing, a speed reducing couple mounted in said auxiliary housing, a driving mechanism between the gear of lesser speed and said splined extension of said tractor drive shaft of said reducing gear couple, a pair of gear wheels loosely mounted upon the rear axle, each driven constantly and in a reverse direction by said driving mechanism and a clutch alternately locking one of said gear wheels to said axle.

7. In a locomotive converted from a tractor and driven by a tractor transmission, and adapted to railroad requirements, wherein the main portion of the original housing of the rear axle and adjacent parts are retained, the combination with the said rear axle housing of an auxiliary housing fitting upon and mounted upon the rear of said rear axle housing and covering a portion of the rear thereof, said rear axle housing having an opening through a portion of its walls covered by the said auxiliary housing, a journal bearing carried in said opening, an extension to the main drive shaft of the tractor extending into said auxiliary housing and having journal bearings and a drive gear within the auxiliary housing, a solid rear axle, gear wheels freely revolvably mounted on said rear axle and a gear train in constant mesh with both gear wheels that are freely revolvably mounted on said rear axle, and with the gear carried by said extension to said main drive shaft, and contained partly within said rear axle housing, and partly within said auxiliary housing, and having one of its shafts extending through the walls of the rear axle housing and journaled therein, the said shaft and the journal bearings therefor closing the opening in the walls of the said rear axle housing, and a clutch provided with locking devices alternately locking one of the gear wheels mounted on the rear axle to said axle.

8. The device as defined in claim 7, wherein the bearing for the shaft of the said gear train that passes through the wall of the rear axle housing is mounted in journal bearings mounted in the walls of said housings, and the said auxiliary housing is also provided with journal bearings for said shaft, said two sets of journal bearings positioning said shaft.

9. The device as defined in claim 7, wherein the auxiliary housing comprising a vertical rear plate having a suitably located rearwardly extending recess carrying in said recess, a journal bearing for the gear train shaft that passes through the wall of the rear axle housing, and plates enclosing said housing and connecting the same to the walls of the rear axle housing.

WILLIAM H. HOODLESS.